(12) United States Patent
Tannas, Jr.

(10) Patent No.: US 7,780,492 B2
(45) Date of Patent: Aug. 24, 2010

(54) APPARATUS AND METHODS FOR RESIZING ELECTRONIC DISPLAYS

(76) Inventor: Lawrence E. Tannas, Jr., 1426 E. Dana Pl., Orange, CA (US) 92866

( * ) Notice: Subject to any disclaimer, the term of this patent is extended or adjusted under 35 U.S.C. 154(b) by 848 days.

(21) Appl. No.: 11/574,504

(22) PCT Filed: Sep. 1, 2004

(86) PCT No.: PCT/US2004/028563
§ 371 (c)(1),
(2), (4) Date: Feb. 28, 2007

(87) PCT Pub. No.: WO2006/028445
PCT Pub. Date: Mar. 16, 2006

(65) Prior Publication Data
US 2009/0004944 A1    Jan. 1, 2009

(51) Int. Cl.
*H01J 9/00* (2006.01)
*G02F 1/1341* (2006.01)
*G02F 1/1339* (2006.01)

(52) U.S. Cl. .......................... 445/25; 445/24; 349/187; 349/190

(58) Field of Classification Search .................... 445/24, 445/25; 349/187–190
See application file for complete search history.

(56) References Cited

U.S. PATENT DOCUMENTS

| | | | |
|---|---|---|---|
| 4,275,494 A | 6/1981 | Kohyama et al. |
| 5,278,685 A | 1/1994 | Iwamoto et al. |
| 5,610,742 A | 3/1997 | Hinata et al. |
| 5,757,456 A | 5/1998 | Yamazaki et al. |
| 5,781,258 A | 7/1998 | Dabral et al. |
| 5,808,719 A | 9/1998 | Fujiwara et al. |
| 5,812,226 A | 9/1998 | Izumi et al. |
| 5,851,411 A | 12/1998 | An et al. |

(Continued)

FOREIGN PATENT DOCUMENTS

EP   0556855 A1   8/1993

(Continued)

OTHER PUBLICATIONS

Doyle, Jr., A2.2: Unexplained Voids, SID International Symposium, vol. XXVI, May 23-25, 1995.

(Continued)

*Primary Examiner*—Mariceli Santiago
(74) *Attorney, Agent, or Firm*—Vista IP Law Group LLP; William A. English

(57) ABSTRACT

Apparatus and methods for resizing COTS AMLCDs or other electronic displays, as well as resized displays made using these apparatus and methods, are provided. The electronic display includes a front plate, a back plate, a perimeter seal spacing the front and back plates apart, and image-generating medium contained in an area between the front and back plates. A target portion of the display may be identified and separated from an excess portion of the display, e.g., by cutting and breaking the plates of the display, thereby creating an exposed edge along the target portion. The plates of the target portion are pressed towards one another, e.g., to stabilize or compress the target portion. An adhesive is applied to the exposed edge, and the pressure is released to draw the adhesive between the plates along the exposed edge.

22 Claims, 7 Drawing Sheets

U.S. PATENT DOCUMENTS

| | | | |
|---|---|---|---|
| 5,929,961 | A | 7/1999 | Nishi et al. |
| 6,191,840 | B1 | 2/2001 | Bon |
| 6,204,906 | B1 | 3/2001 | Tannas |
| 6,380,999 | B1 | 4/2002 | Tannas |
| 6,509,949 | B1* | 1/2003 | Lu et al. ............... 349/187 |
| 7,256,862 | B2* | 8/2007 | Chen et al. ............ 349/192 |
| 7,595,857 | B2* | 9/2009 | Yang et al. ............. 349/187 |
| 2002/0044253 | A1* | 4/2002 | Masuda et al. ......... 349/190 |
| 2003/0184706 | A1 | 10/2003 | Watson |
| 2004/0074366 | A1 | 4/2004 | Choo et al. |
| 2005/0001974 | A1* | 1/2005 | Iida et al. .............. 349/187 |
| 2005/0056127 | A1 | 3/2005 | Yamabuchi et al. |

FOREIGN PATENT DOCUMENTS

| | | |
|---|---|---|
| GB | 2183073 | 5/1987 |
| GB | 2330423 A | 4/1999 |
| GB | 2381080 | 4/2003 |
| JP | 59017532 | 1/1984 |
| JP | 60146228 | 8/1985 |
| JP | 61186941 | 8/1986 |
| JP | 61210326 | 9/1986 |
| JP | 2235026 | 9/1990 |
| JP | 3293633 | 12/1991 |
| JP | 08076074 | 3/1996 |
| JP | 08122769 | 5/1996 |
| JP | 08146444 | 6/1996 |
| WO | 9919765 | 4/1999 |
| WO | 03040049 | 5/2003 |

OTHER PUBLICATIONS

Orkis, F-16 Retrofit Application, SPIE Proceedings Cockpit Displays, vol. 2219, Apr. 7-8, 1994.

Loctite Output 315 Product Information, Jun. 1999.

Vetter et al., Influence of Fabrication Process, Eurodisplay '90 Conference, Sep. 25-27, 1990.

Doyle, ARC-164 Liquid Crystal Void Investigation Meeting Minutes, Apr. 25-26, 1994 and Sep. 1993.

Tannas, Jr., Worldwide Availability of Avionics-Grade AMLCD Panels, Mar. 1994, pp. 1-23.

Tannas, Jr., Ruggedized AMLCD Solutions from Electronic Designs Inc., Jun. 1994, pp. 24-31.

Tannas, Jr., Ruggedizing a Commercial AMLCD, Jul. 1994, pp. 32-43.

Tannas, Jr., Liquid Crystal Displays: An Engineering Overview, Sep. 1995, pp. 44-45.

Tannas, Jr., Large High Resolution FPDs from Japan, Jun. 1996, pp. 46-50.

Tannas, Jr., Flat-Panel Displays: The Next Electronic Revolution?, Oct. 1997, p. 51.

Tannas, Jr., Laws for the Design of the Universal Cockpit Display, Apr. 1998, pp. 52-59.

Tannas, Jr., Application of Back-lit AMLCDs to Avionics, Apr. 1998, pp. 60-73.

Morozumi, Shinji, (Edited by Biredra Bahadur), Liquid Crystals: Applications and Uses, vol. 1, World Scientific Publishing Co., 26 pgs., 1990.

Decision-Priority, from Patent Interference No. 105,096; *Tannas v. Watson*, May 9, 2005, 24 pgs.

PCT International Search Report and Written Opinion for PCT/US2004/028563, Applicant: Lawrence E. Tannas, Jr., Forms PCT/ISA/210, PCT/ISA/220 and PCT/ISA/237, dated Jun. 14, 2005, 7 pages.

PCT International Preliminary Report on Patentability for PCT/US2004/028563, Applicant: Lawrence E. Tannas, Jr., Forms PCT/IPEA/416 and PCT/IPEA/409 with amended sheets, dated Jan. 31, 2007, 18 pages.

European Patent Office, Supplemental European Search Report for EP Application No. 04782955.1 (European entry from PCT/US04/28563), Applicant: Lawrence E. Tannas, Jr., Forms EPO Forms 1507. 4, 1503 and P0459, dated Jun. 26, 2008, 3 pages.

Russian Patent Office, Office Action in English and Russian with two (2) cited references for Russian Application No. 2007111904/28 (Russian entry from PCT/US04/28563), Applicant: Lawrence E. Tannas, Jr., dated Aug. 5, 2008, 42 pages.

Chinese Patent Office, First Office Action in English and Chinese for Chinese Application No. 200480042897.9, Applicant: Lawrence E. Tannas, Jr., dated Sep. 28, 2007, 9 pages.

Applicant Response to First Office Action for Chinese Application No. 200480042897.9, dated Feb. 13, 2008, 12 pages.

Chinese Patent Office, Second Office Action in English and Chinese for Chinese Application No. 200480042897.9, Applicant: Lawrence E. Tannas, Jr., dated Mar. 14, 2008, 11 pages.

Applicant Response to Second Office Action for Chinese Application No. 200480042897.9, dated Apr. 15, 2008, 8 pages.

* cited by examiner

APPARATUS AND METHODS FOR RESIZING ELECTRONIC DISPLAYS

FIELD OF THE INVENTION

The present invention relates generally to electronic displays, and more particularly to apparatus and methods for modifying electronic displays, e.g., to customize, resize, and/or ruggedize an original display, and to displays manufactured using such apparatus and methods.

DEFINITIONS

In this application, COTS is an acronym for "Commercial Off-The-Shelf," FPD is an acronym for "Flat-Panel Display," LCD is an acronym for "Liquid Crystal Display," PDLC is an acronym for "Polymer-Dispersed Liquid Crystal," AMLCD is an acronym for "Active Matrix Liquid Crystal Display," TAB is an acronym for "Tape-Automated-Bonding," COG is an acronym for "Chip-On-Glass," UV is an acronym for "ultraviolet," VLSI is an acronym for "Very Large Scale Integration," and HDTV is an acronym for "High-Definition Television."

BACKGROUND

Electronic displays are commonly used to portray data, e.g., in the form of visual text and/or other images, so the data may be interpreted and/or acted upon. Typically, the operator of equipment associated with the display will control the equipment based, at least in part, on the interpretation of the data displayed. A simple example is an airplane pilot who views a control panel display representing surrounding air traffic, and who then controls the airplane to avoid the traffic.

Typically, the displays and their associated bezels (face plates) and frames (interfacing and supporting hardware) are built to demanding specifications for durability, reliability, and operating life, e.g., based upon industry requirements, and the resulting displays may have relatively complex electrical, chemical, optical, and/or physical characteristics. Each particular application, for example, may require specific performance characteristics from the display, such as the ability to accommodate or withstand varying conditions of temperature, humidity, radiation, ambient light, shock, vibration, impact, chemicals, salt spray, water and fluid condensation, immersion, or other environmental, electrical, physical, and/or other conditions. Due to the high costs associated with such varying and demanding specifications, for any particular application, it is thus economically desirable for manufacturers to produce a common design in high production volume, resulting in COTS displays all having substantially the same characteristics and a limited number of physical sizes. The sizes may vary, but the shapes are generally rectangular with an aspect ratio of approximately three to four. For example, common television and computer displays have an aspect ratio of approximately three to four, and HDTV displays have an aspect ratio of nine to sixteen.

For specialized applications where the market may not be large enough for COTS manufacturers to enter, buyers of displays are required to have displays custom-built to fit their size and shape requirements, at a cost often more than ten times greater than the cost of a COTS display having nearly identical functionality. Alternatively, buyers may choose to incorporate a COTS display into an existing control panel or dashboard opening, e.g., by physically altering the size and/or shape of the control panel opening to match the size and/or shape of the COTS display. For most applications, however, such modifications cannot be made without disturbing the surrounding instruments, controls, and displays already incorporated into the control panel. Such is the case, for example, on an airplane control panel or other vehicle control panel where large numbers of instruments and controls are tightly and efficiently packed into a relatively small area. Even if the appropriate modifications could be made, they are typically cost-prohibitive.

A particular industry where high-cost custom-built displays are used is the avionics industry, which traditionally used square panel openings to house mechanical display devices. To retrofit airplane control panels with electronic displays, the industry began manufacturing custom displays at a relatively high cost and relatively low volume compared to COTS non-square displays that are commercially used in high volume applications. In fact, the control panels in newly-built airplanes designed to use electronic displays are still often made with square panel openings, despite the COTS displays being non-square, in order to maintain the well-established and familiar control panel configurations.

SUMMARY OF THE INVENTION

The present invention is directed to apparatus and methods for modifying electronic displays, e.g., to customize, resize, and/or ruggedize an original display, and to displays manufactured using such apparatus and methods.

Typically, a COTS AMLCD or other electronic display includes two plates, front and back, that include orthogonal row and column electric leads distributed throughout an image-generating medium contained between the plates. The display also includes a perimeter seal holding the plates together while isolating and protecting the internal image-generating medium from the outside environment. The plates are typically glass or plastic, and may have polarizers, filters, image enhancement films, and/or viewing angle enhancement films, e.g., attached to their outer surfaces.

The plates of the display may hold drive electronics on their edges and/or the drivers may be integral in the display. The row and column electric leads transcend the seal to external leads to which the driver electronics are attached. Typically, the electronic drivers are VLSI circuits bonded to TAB substrates attached to the display, or directly attached to the display as COG. In some instances, the VLSI electronic drivers are made in-situ along the edges of the display.

The present invention involves systems and methods for modifying a COTS display, e.g., by changing the physical size and/or shape of the COTS display to meet the requirements of a target application. This may be accomplished by cutting the COTS display to reduce its physical size and/or shape, and then resealing the display to achieve the desired performance. The basic functionality of the COTS display may remain intact, that is, the customized display may have a new size and/or shape, and may have altered electronic drivers, image-generating media, rearranged electronics, additional seals, additional films, etc. Optionally, the resized display may have enhanced functionality. However, the customized display should be able to operate in a target application designed to interface with a display of the same type (e.g., LCD) as the original (e.g., COTS) display.

When the plates are cut, internal electronics may also be cut, often requiring reestablishment of electrical continuity. Similarly, the display electronics may be removed, reattached, and/or otherwise modified, and filters, polarizers, and/or other films associated with the display may be cut, e.g., to conform to the customized display size and/or shape. Thus, the opportunity exists to add enhanced functionality to the display. Optionally, a custom bezel and/or frame may then be used to house the display, e.g., allowing for additional ruggedization of the entire unit.

To reseal the display, an adhesive is applied along at least the cut edge or edges, e.g., between the plates of the display along the cut edge(s). Optionally, a second seal may be added to minimize penetration of humidity and other contaminants into the display medium (e.g., liquid crystal material) inside the display cell. A third seal, e.g., serving as a mask, may also be applied to prevent light, such as that used to back-light LCDs, from passing through the display's outer edges.

Electronic drivers, typically VLSI circuits (bonded to TAB substrates attached to the display, or attached directly to the display as COG) may be added, repositioned and/or reattached as needed, and the circuitry on the display plates may be altered to make electrical connection to the new VLSI circuits. Filters, films, polarizers, etc. may then be cut and/or installed as desired, and additional components such as heaters, optical elements, infrared filters, touch panels, transducers, etc., may be added to alter and/or enhance durability or functionality of the display.

Finally, the reshaped, resized, and/or otherwise modified display may be placed in a custom bezel and frame with appropriate ruggedization characteristics. The bezel and frame may be designed to accommodate the newly sized and/or shaped display in a suitable manner, and/or to allow for proper mechanical and electrical attachment to the target location, such as an avionics box or display panel. The bezel and frame may also be configured for installation such that appropriate lighting, optical elements, transducers, heaters, infrared filters, touch panels, etc., associated with the target application operate properly. Thus, the frame may protect the display and interface the display with the target location, such as an avionics box or display panel. Suitable adhesives, sealants, conformal coatings, potting compounds, electrical and thermal conductors, screws, clamps, rivets, connectors, gaskets, etc., may be used as necessary or desired to further ruggedize the unit and install it into its target location. For example, ruggedization may be required before installing the customized unit into environments for vehicles, ships, submersibles, missiles, aircraft, spacecraft, portable equipment, etc., which tend to be more restrictive and severe than the environments for which COTS displays are designed.

Thus, one aspect of the present invention may involve cutting an electronic display along desired dimensions, resulting in a target display portion and an excess display portion, and applying a first seal between the plates along an exposed edge of the target display portion, the first seal creating a barrier to prevent the image-generating medium from escaping out of the area between the plates. A second seal and/or a third seal may be added, e.g., for environmental protection and edge light control respectively. The first seal may also serve these purposes.

Another aspect of the invention involves resizing or otherwise modifying the associated electronics of a display. For example, the electronic circuits inside the display and/or peripheral to the display may be resized to the same degree necessary to achieve the desired display size.

In accordance with another aspect of the invention, a method is provided for resizing, customizing, enhancing or otherwise modifying an electronic display that includes one or more of the followings steps in this or other orders or sequences: removing excess electronics from the display; cutting one or more circuit boards of the display; removing at least a portion of polarizers and/or other films, as necessary, from one or both plates of the display, e.g., along the intended cut line(s); cleaning along the intended cut line(s); scribing the plates along the desired line(s), e.g., with a glazer's wheel, saw, laser, and the like; breaking the plates to separate a target portion from an excess portion, thereby creating an exposed edge of the target portion; stabilizing the display, e.g., in a fixture to apply sufficient pressure to restore the original distance between the plates and/or prevent the plates from expanding; removing liquid crystal (LC) from between the plates along the exposed edge, e.g., by wicking, draining, compressing the plates together to eject LC material, and the like, to create a region for adhesive between the plates; clean the exposed edge; apply adhesive along the exposed edge; degas the adhesive; cause or allow adhesive to go between the plates, e.g., without significantly changing the distance between the plates, clean the adhesive, and cure adhesive.

In yet another aspect of the invention, resized, customized, or otherwise modified electronic displays are provided that include cut or otherwise exposed edges and/or one or more seals along and/or between the plates of the displays, e.g., made using one or more of the methods described herein.

Other aspects and advantages of the present invention will be apparent from the detailed description which follows, when read in conjunction with the associated drawings.

DETAILED DESCRIPTION

Figure 1A:
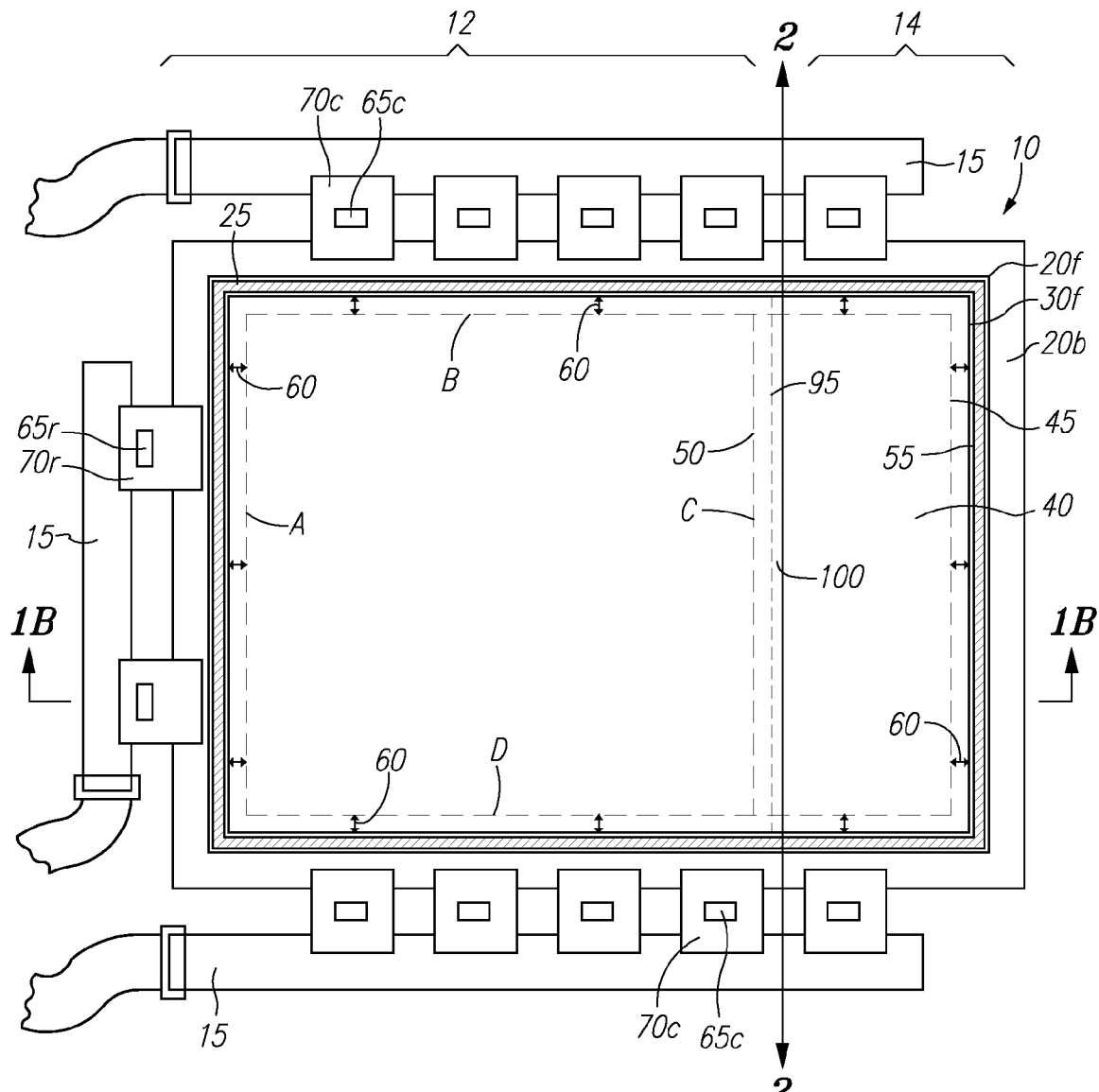
FIG. 1A is a plan view of a typical COTS AMLCD.
Figure 1B:
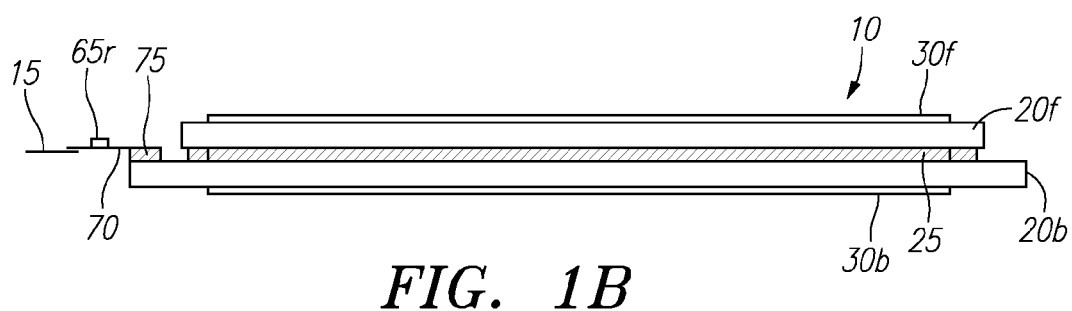
FIG. 1B is a cross-sectional view of the COTS AMLCD of FIG. 1A, taken along line 1B-1B, with column TABs removed from the cross-section for purposes of clarity.

Turning to the drawings, FIGS. 1A and 1B show a typical non-square COTS AMLCD 10, e.g., before resizing and/or other modification as described herein, but after disassembly from its original bezel, frame, and other associated hardware and electronics. For clarity, some of the external components associated with the display 10 (other than the circuit boards 15) are not shown, e.g., that may be bonded or otherwise attached to the display plates 20*f* and 20*b*. Such external components may be removed before or while customizing the display 10, as described elsewhere herein.

The display 10 generally includes a front plate 20f and a back plate 20b, e.g., made of glass or plastic, such as borosilicate or other hard glass. The plates 20 are held together by a perimeter seal 25, and may be further secured within a bezel (not shown), which, in turn, may be secured to a frame or other hardware (not shown), e.g., for attachment to the target location, e.g., in a cockpit panel of an aircraft. Polarizing films 30f and 30b, filters (not shown), image enhancement films (not shown), retardation films (not shown), viewing angle enhancement films (not shown), and/or other films may exist on the front and/or back outer surfaces of the plates 20. The original display image area 40 defined by the manufacturer of the COTS display 10 is indicated by dashed perimeter line 45. Dashed line 50 represents the desired right edge of the display image area 40 after customization, as described below. A light-blocking mask (not shown), e.g., an opaque coating, may be provided on at least one of the inner surfaces of the plates 20, e.g., covering a perimeter area around the display image area 40, and extending outwardly to a sufficient distance to serve its purpose. Typically, the distance may be up to the edge of the bezel, or to the inner edge 55 of perimeter seal 25, as indicated by arrows 60 in FIG. 1A. Without the mask, light escaping from the edge of the display image area 40 may distract a person viewing the display 10 and/or otherwise impair viewing an image on the display 10.

Row and column electronic drivers 65r and 65c respectively are bonded to TAB substrates 70r and 70c respectively, which in turn are bonded to the edges of the plates 20, e.g., using electrically-anisotropic adhesives 75 known in the art. In avionics, bent TABs (not shown) may be used to save panel area. In addition or alternatively, the drivers 65 may be attached directly to the plates 20 as COGs. The TABs 70 may be bonded or soldered to circuit boards 15, and are electrically connected to external sources via connections 90 to circuit boards 15. COGs (not shown) may be electrically connected to the edges of the display plates 20, which may be electrically connected via ribbon cables to external sources (not shown). For simplicity, a few exemplary connections 90 are shown in FIG. 2A, although it will be understood that they may be provided as desired or needed.

Figure 2A:
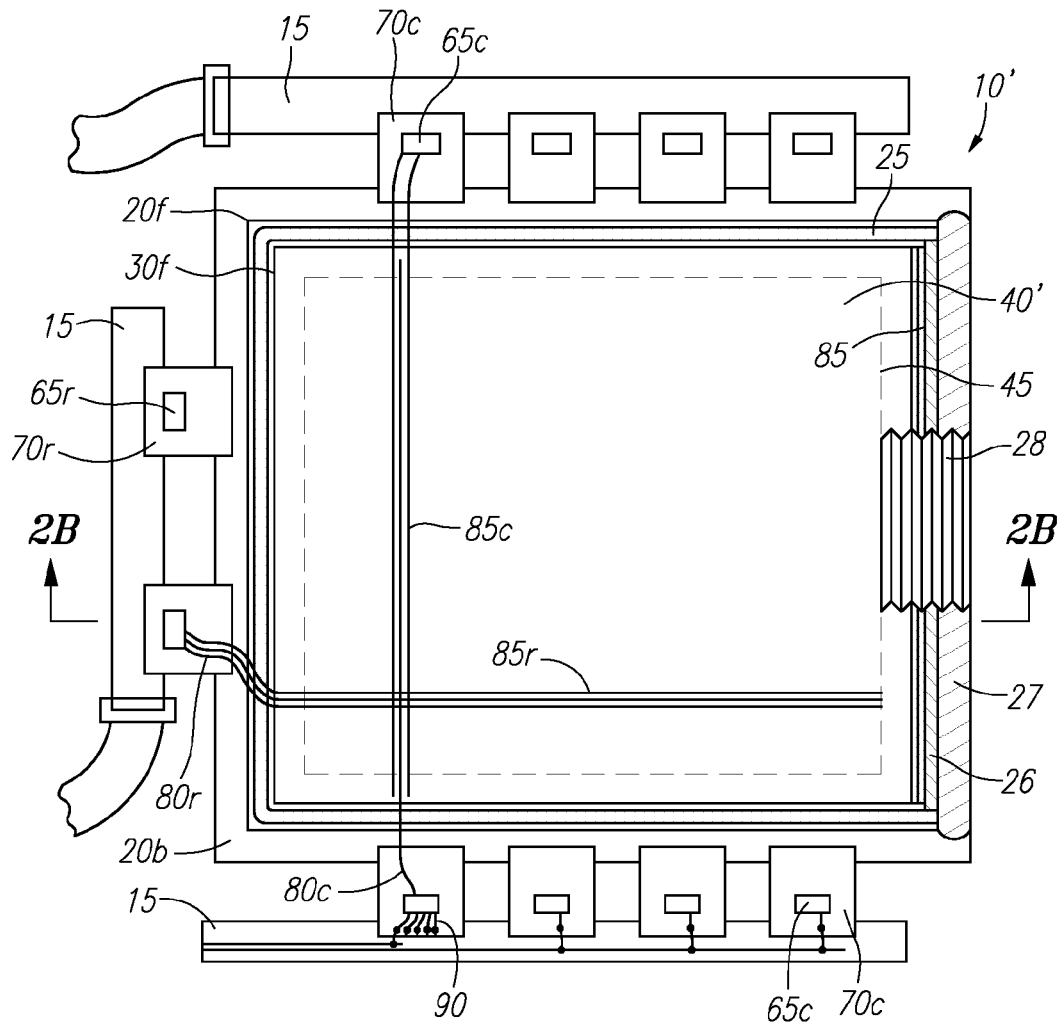
FIG. 2A is a plan view of a customized display made from the COTS AMLCD shown in FIG. 1A, by cutting along line 2-2 in FIG. 1, and then resealing a retained portion of the display.

The electronic drivers 65 may include VLSI circuits having corresponding external leads 80r and 80c that are electrically connected through perimeter seal 25 to row and column electric leads 85r and 85c, respectively (see FIG. 2A). Again for simplicity, only a few leads 80 from one row TAB 70r and two column TABs 70c are shown in FIG. 2A, but it is understood that each row TAB 70r and each column TAB 70c may have dozens or even hundreds of individual leads 80. The row and column electric leads 85 may be distributed throughout an image-generating medium, such as liquid crystal material (normally transparent) contained between the plates 20, as seen in FIG. 2A.

In addition to holding the plates 20 together, the perimeter seal 25 substantially isolates and protects the image-generating medium from the outside environment. In addition, precisely sized spacers (not shown) may be distributed throughout the image-generating medium. After conventional manufacturing, the region between the plates 20 may be maintained at a partial vacuum to draw the plates 20 against the spacers, e.g., to ensure that the distance between the plates 20 is maintained at a predetermined cell spacing or "cell gap," e.g., between about five (5) and six (6) micrometers, which is appropriate for the display 10 to operate normally. Although a COTS AMLCD is described, it will be appreciated that the tools and methods described herein may be used to customize or otherwise modify other electronic displays, such as passive matrix LCDs, plasma panels, organic LEDs, and the like.

Figure 2B:
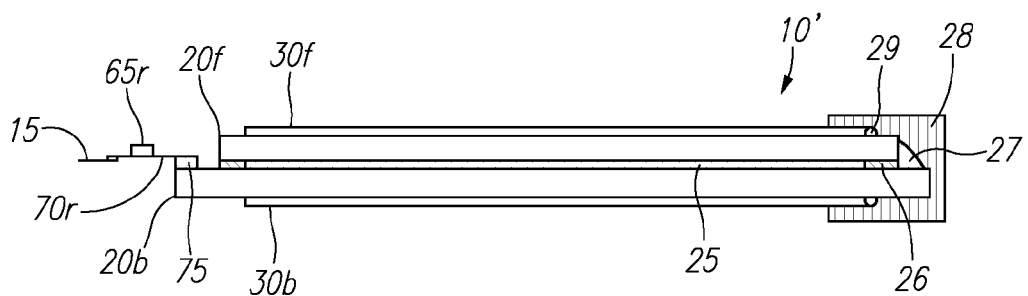
FIG. 2B is a cross-sectional view of the customized display of FIG. 2A, taken along line 2B-2B, with the column TABs removed from the cross-section for purposes of clarity.
Figure 3:
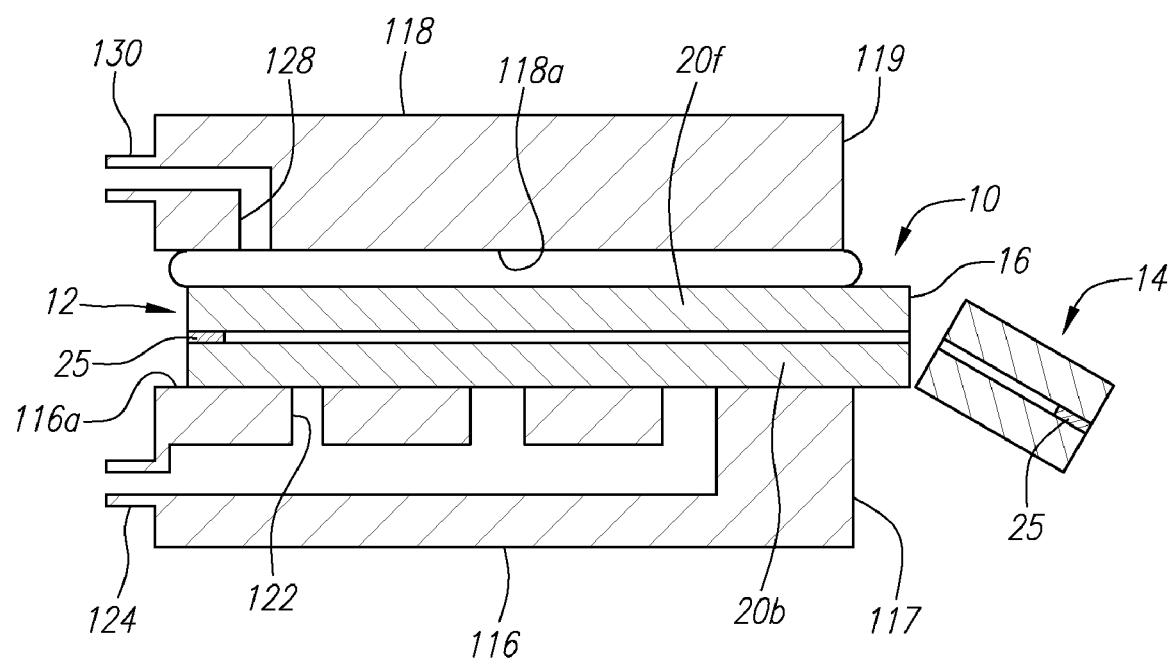
FIG. 3 is a cross-sectional view of a fixture including a pair of pressure plates holding an electronic display between the pressure plates.

With reference to FIGS. 1A-2B, an exemplary method will now be described for customizing the COTS display 10 of FIGS. 1A and 1B to create the customized display 10' shown in FIGS. 2A and 2B. The COTS display 10 may be customized in varying degrees, as necessary or desired, and the examples provided herein are not to be viewed as setting forth required techniques unless specifically so stated.

Initially, a cut line may be identified, such as cut-line 2-2 in FIG. 1A, which may separate a target portion 12 of the COTS display 10 (e.g., corresponding to the portion to be retained to create the customized display 10') from an excess portion 14 (e.g., corresponding to the portion that may be discarded or saved for other purposes). In the example shown, the target portion 12 is substantially square, e.g., corresponding to a standard shape of a region of an airplane control panel (not shown).

Once the cut-line 2-2 is identified, circuit boards 15 may be cut by known techniques, such as sawing, e.g., along cut-line 2-2. Alternatively, the circuit boards 15 may be removed entirely, e.g., if new circuits boards are to be attached to the customized display 10'. In addition or alternatively, TABs 70 may also be cut or removed, e.g., using similar procedures. If the cut-line 2-2 requires cutting through an electronic driver 65, the driver may need to be relocated and/or replaced.

Next, if one or both plates 20 include a polarizer 30 (and/or one or more other films), at least the portion(s) of the polarizer(s) 30 overlying the cut-line 2-2 may be removed. For example, in one embodiment, the polarizer(s) 30 may be scored, e.g., inside the cut-line 2-2, to create a target polarizer portion overlying the target portion, which may be retained during the customization process. The remainder or excess polarizer portion (e.g., overlying the cut-line 2-2 and the excess portion 14 of the COTS display 10) may then be removed and/or discarded. In another embodiment, the polarizer(s) 30 may be scored along two lines on either side of the cut-line 2-2, and the resulting strip may be removed to provide access to the underlying plate(s) 20.

In still another embodiment, the portion of the polarizer(s) 30 immediately overlying the cut-line 2-2 (or offset to either side of the cut-line 2-2, if desired) may be scored or otherwise removed in a single pass, e.g., by creating a narrow channel or trench through the polarizer(s) 30 to the surface of the plate(s) 20. For example, to expose the surface of each of the plates 20, a circular saw blade (not shown) of suitable width, powered by a motor, may be drawn precisely along the intended scribe line at a depth substantially equivalent to the thickness of the polarizer 30 (and/or other films).

Any sawdust, remaining film adhesive, and/or other residue may be removed, e.g., to clear the exposed surface of the plate 20. For example, a vacuum line, a cleaning wheel, a nozzle for a solvent or other liquid, and/or other tool may be directed along the cut-line 2-2 to remove any such residue. Such tools may follow the saw blade, e.g., may be coupled to an arm or other carrier controlling movement of the saw blade along the plate 20. In addition or alternatively, the resulting channel may be cleaned or otherwise prepared after creating the trench, which may facilitate accessing the surface of the plate(s) 20 during the subsequent cutting procedure. Exemplary apparatus and methods for creating such a trench are disclosed in co-pending U.S. application Ser. No. 60/573, 421, filed May 21, 2004, entitled "Apparatus and Methods for Cutting Electronic Displays During Resizing," the entire disclosure of which is expressly incorporated herein by reference.

Thus, it may be desirable to allow the original polarizer(s) 30 (and/or other films) to remain intact over a target display image area 40' while still providing unobstructed access to the plates 20, e.g., for cutting or otherwise separating portions of the plates 20 using the procedures described elsewhere herein. For example, in FIG. 1A, the target display image area 40' of the target portion 12 is defined by a square A-B-C-D, and the polarizer(s) 30 should remain intact at least over this area. The target score line for the polarizer(s) 30 may be the same as line 2-2. If so, the resulting trench should be wide enough to allow a scribe wheel or other glass-cutting tool (not shown) to reach the surface of the plate(s) 20 through the polarizer(s) 30. For example, the trench may have a width of not more than about 0.050 inch (1.25 mm), and/or less than about 0.030 inch (0.75 mm).

Alternatively, a COTS display 10 may be taken from its original manufacturing line before it is completed to simplify resizing. For example, the COTS display 10 may be intercepted before the polarizer(s) 30 (and/or other films) and/or electronics are attached. Such omitted items may be added to the customized display (appropriately configured for the customized display 10') after resizing.

Next, the plates 20 of the COTS LCD 10 may be cut, e.g., using a glass-scribing-and-breaking technique, to separate the target and excess portions 12, 14 of the COTS display 10. First, the plates 20 are "scribed," i.e., a vent is formed along the cut-line 2-2 in each of the plates. For example, with a glazer's wheel (not shown), a vent may be created successively in each of the plates, e.g., aligned with cut-line 2-2 or offset to one side of and parallel to the cut-line 2-2. It is known that such vents may simply appear as a scratch on the glass surface, yet may penetrate partially into the plates 20. It will be appreciated that, after scribing the plates 20, the target and excess portions 12, 14 are not separated after the plates 20 are scribed, and, in fact, the interior region of the COTS display 10 may remain substantially sealed, e.g., at its original vacuum or other pressure, until the target and excess portions 12, 14 are actually separated from one another. Alternatively, the target and excess portions 12, 14 may separate spontaneously or naturally after being scribed.

The scribe line along each of the plates 20 may be performed in a single step or in multiple steps, e.g., using a glazer's wheel, or alternatively by laser scribing, sawing, grinding, etc. Any other procedure sufficient to ensure a substantially smooth scribe line in glass (or other materials of the plates 20) may be utilized. Some LCDs, such as AMLCDs, may include plates made from borosilicate hard glass. For such materials, approximately twenty (20) pounds of force has been shown to be sufficient for scribing the glass using a glass scribing wheel. The scribe wheel may be made of diamond or may be a hard carbide type wheel, e.g., having a diameter of about three to four millimeters (3-4 mm), and including a sharp angle, e.g., approximately one hundred thirty five degrees (135°)).

To facilitate scribing the plates 20 the COTS display 10, the COTS display 10 may be mounted in a vacuum chuck or other tool (not shown), e.g., to stabilize the COTS display 10. Exemplary tools that may be used to scribe the plates 20 may include those manufactured by Villa Precision International of Phoenix, Ariz. The tool may include a processor (also not shown) for precisely controlling components of the tool, e.g., in orthogonal x, y, and z directions. For example, the processor may direct the glazer's wheel along the surface of the plates 20 in a desired path while maintaining the desired degree of pressure/force against the plates 20. Optionally, the tool may rotate the COTS display 10 within the plane of the plates 20, e.g., if a curved scribe line is desired. Thus, the tool may control the saw, cleaning wheel, and/or scribe in a preprogrammed sequence while maintaining sufficient precision and pressures to remove the film, clean the channel, and scribe the glass along the desired cut-line 2-2, e.g. using a single or multiple tool heads.

Next, the plates 20 may be broken to separate the target portion 12 from the excess portion 14. It is not customary in the display industry to break the display across an internal seal line. However, the plates 20 may broken along one or more scribe lines that extend through one or more internal seal lines using methods similar to those used to cut glass plates without such seal lines. The internal seal line(s) may provide some additional resistance to separate the two portions 12, 14, and therefore may require additional displacement of the portions 12, 14 relative to one another.

Optionally, to finish cutting the COTS display 10, the COTS display 10 may be transferred from the vacuum chuck or other scribing tool (if used to scribe the plates 20 of the COTS display 10) to a pressure plate tool 110. Alternatively, appropriate tools may be included on the scribing tool for accomplishing the cutting.

For example, using the pressure plate tool 110 of FIGS. 3 and 4A-4c, the plates 20 of the COTS display 10 may be broken along the scribed line(s) while substantially maintaining the spacing of the plates 20, e.g., of the target portion 12. In addition, the pressure plate tool 110 may be used to degas the COTS display 10 and/or reseal any exposed edges of the COTS display 10, e.g., of the target portion 12, as described further below. Generally, the pressure plate tool 110 includes a pair of pressure plates 116, 118 or other fixture (not shown) and a pressure chamber 114. The pair of pressure plates may include a first plate 116, which may be mounted to a base 120, and a second plate 118, which may be mounted to the first plate 116.

Figure 4A:
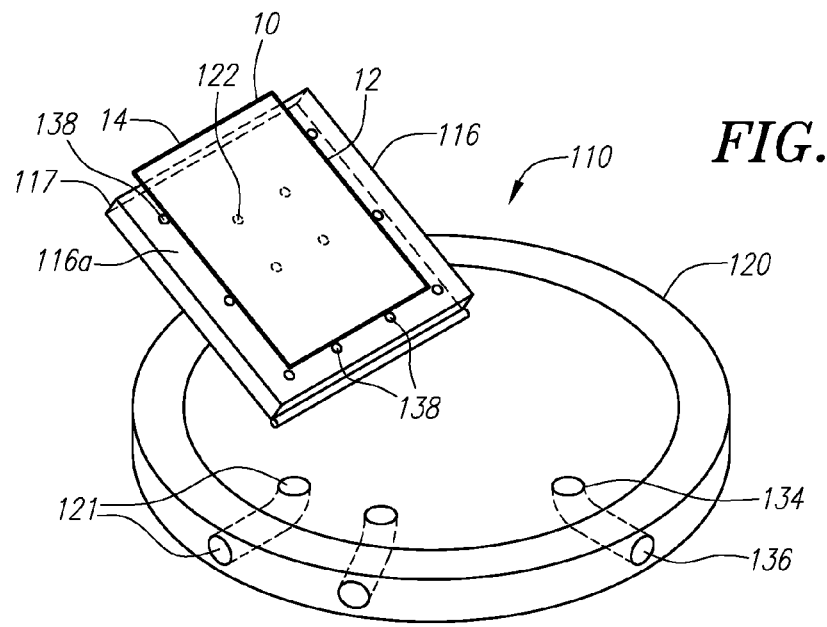
FIG. 4A is a perspective view of an apparatus for resizing an electronic display, including a pressure plate tool in its open position with a display in place on a first pressure plate of the tool.
Figure 4B:
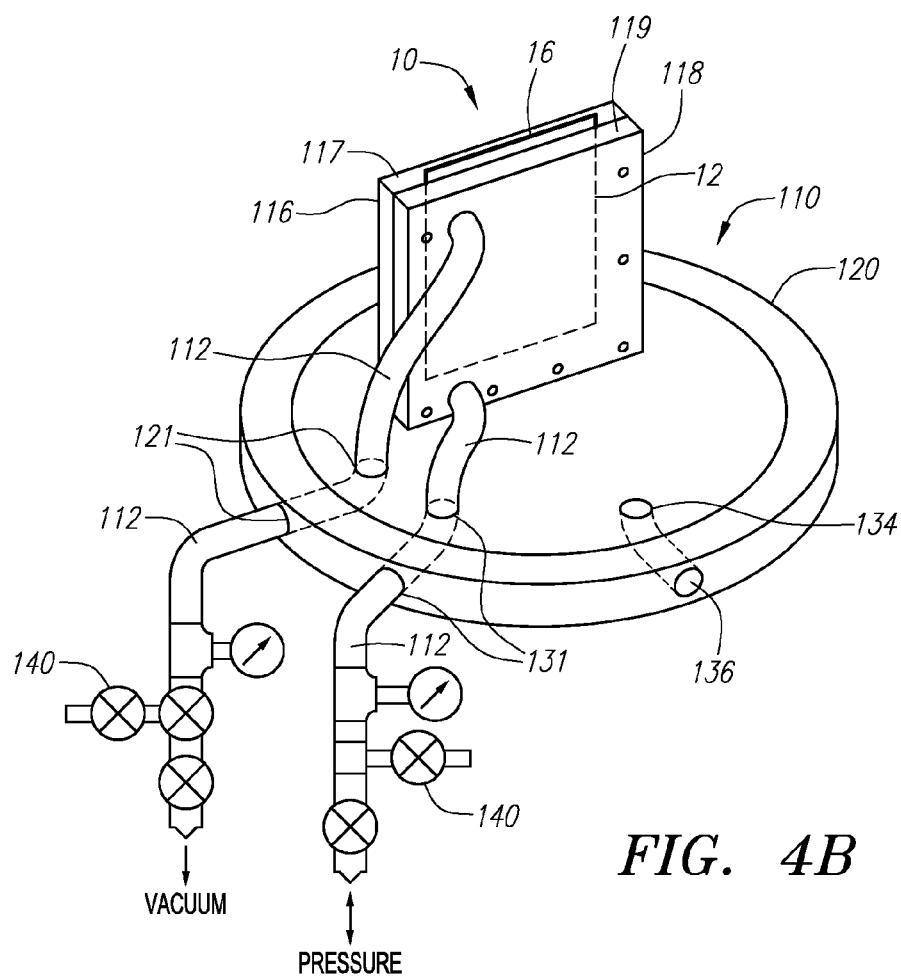
FIG. 4B is a perspective view of the apparatus of FIG. 4A, with a second pressure plate of the pressure plate tool secured to the first pressure plate for holding the display in an orientation for adhesive application.

In the embodiment shown in FIGS. 4A and 4B, the first pressure plate 116 is pivotally mounted to the base 120 such that the first plate 116 may be moved between a transverse, e.g., substantially horizontal, orientation (shown in FIG. 4A) and an upright, or substantially vertical, orientation (shown in FIG. 4B). Alternatively, the first plate 116 may be removable from the base 120 or may be fixed, e.g., in the vertical orientation.

Figure 5A:
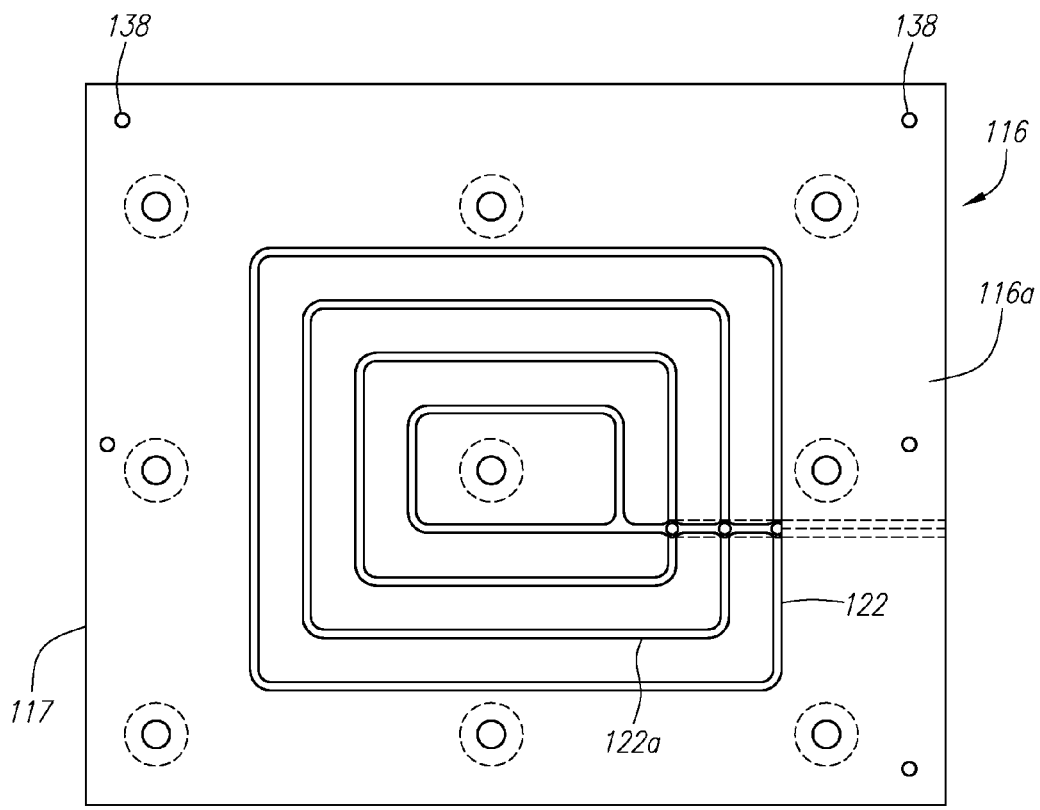
FIGS. 5A and 5B are top and side views, respectively, of a first pressure plate for the pressure plate tool of FIGS. 4A-4C.
Figure 5B:
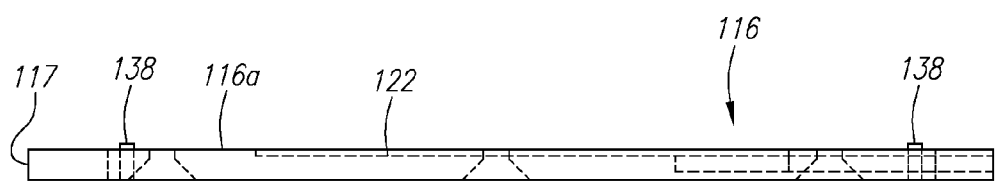

With additional reference to FIGS. 5A and 5B, the first plate 116 may include an inner surface 116a including one or more apertures 122 therein communicating with a port 124. The port 124 may be coupled to a first vacuum source (not shown), e.g., via one or more sections of tubing 112 (shown in FIG. 4B, e.g., coupled to ports 121 in the base 120). After a display, e.g., the COTS display 10, is placed against the inner surface 116a of the first plate, the first vacuum source may be activated, and the resulting vacuum may secure the target portion 12 against the inner surface 116. The apertures 122 may be provided in a predetermined arrangement, e.g., a plurality of concentric channels 122a, as shown in FIG. 5A. It will be appreciated that other arrangements, similar to known vacuum chucks (not shown), may be provided. Optionally, the first pressure plate 116 may also be used as a vacuum chuck, e.g., in the transverse orientation, to stabilize the COTS display 10 while a scribing wheel is directed along the exposed plate 20, similar to the procedures described above.

Returning to FIGS. 3 and 4A-4C, the second pressure plate 118 may include an inner surface 118a against which a bladder 126 is secured or otherwise disposed. The second pressure plate 118 may include one or more apertures 128 (one shown in FIG. 3 for illustration only) within the interior of the bladder 1226 that communicate with a port 130. The port 130 may communicate with a pump, a compressed gas container, or other source of inflation media (not shown), e.g., via tubing 112 connected to ports 131 in the base 120, thereby allowing inflation media, e.g., air, gas, oil, water, and the like, to be delivered into an interior of the bladder 126 to expand the bladder 126. The bladder 126 may be formed from an elastic material or a substantially inelastic material, e.g., transparent silicone rubber, having a thickness of about 0.80 millimeter (1/32 inch). The bladder 126 may be provided as a sheet whose edges are secured around the inner surface 118*a* of the second plate, e.g., using an adhesive, fasteners, and/or a tongue and groove or other mechanical interference fit (not shown). Alternatively, the bladder 126 may be a balloon or other enclosed member, e.g., with one or more ports, that may be bonded or otherwise attached to the inner surface 118*a*.

Figure 4C:
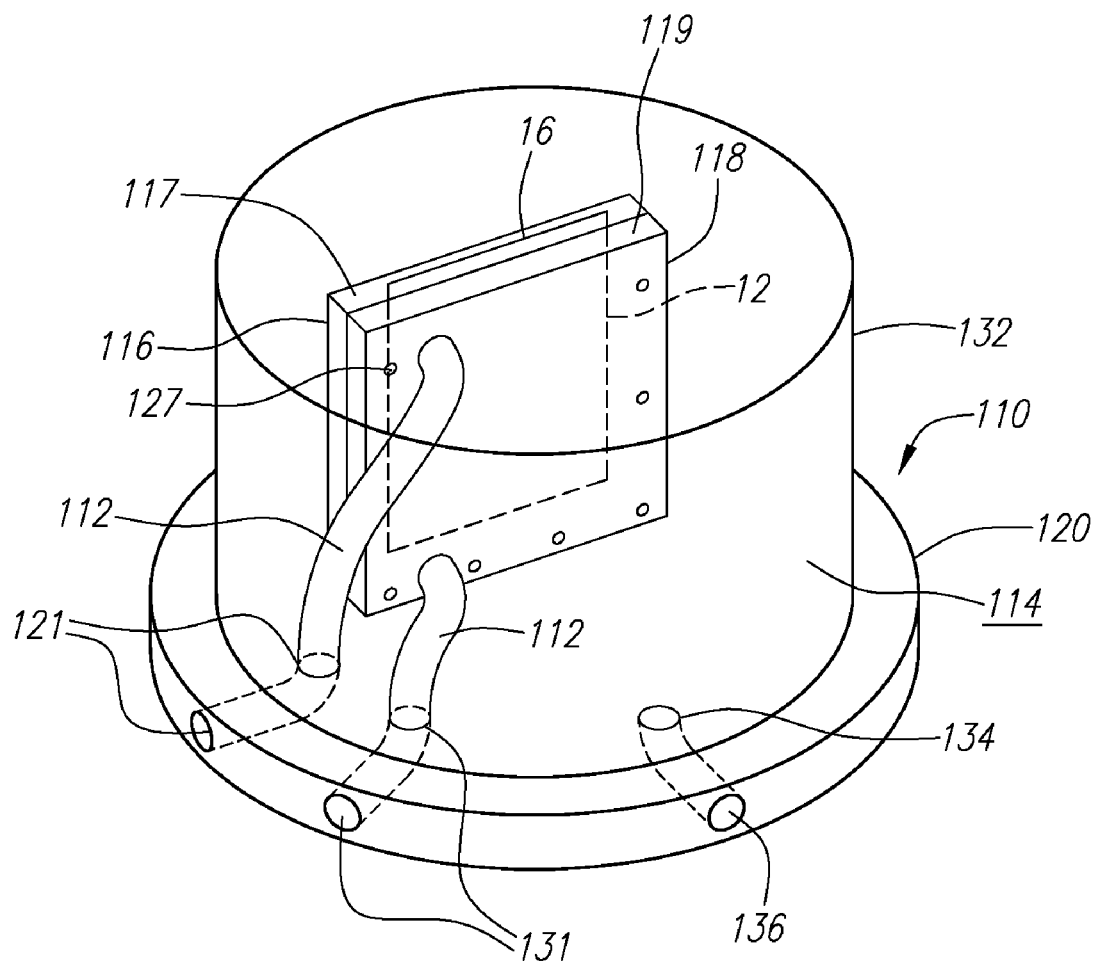
FIG. 4C is a perspective view of the apparatus of FIGS. 4A and 4B, including a cover disposed over the pressure plate tool for degassing the display.

With reference to FIG. 4C, the tool 110 may also include a cover 132 that may be placed over the pressure plates 116, 118 to define the pressure chamber 114. For example, the cover 132 may contact the base 120 to substantially isolate the pressure chamber 114 from the surrounding environment. One or both of the cover 132 and base 120 may include one or more seals (not shown) for enhancing a seal between the base 120 and cover 132 to substantially seal the pressure chamber 114. The base 120 may include one or more apertures 134 therein communicating with the pressure chamber 114 and with a port 136 in the base 120. The port 136 may be connected to a second vacuum source (not shown), e.g., via tubing (not shown), which may be the same or different source than the first vacuum source, for evacuating air from the pressure chamber 114, e.g., to expose the target portion 12 of the COTS display 10 to a vacuum, as described further below. Optionally, one or more of the first and second vacuum sources and the source of inflation media may include a release valve 140 (two shown in FIG. 4B) for exposing the respective ports 121, 131 to ambient pressures.

Returning to FIGS. 3 and 4A-4C, the tool 110 may be used to facilitate breaking and/or resealing a display, e.g., the COTS display 10. Initially, as shown in FIG. 4A, with the first pressure plate 116 in the transverse orientation, the target portion 12 of the COTS display 10 may be placed on the inner surface 116*a* of the first pressure plate 116. As shown in FIGS. 4A, 5A, and 5B, the first pressure plate 116 may include one or more alignment pins 138 extending from the inner surface 116*a* for placing the target portion 12 in a predetermined orientation on the inner surface 116*a*. The pins 138 may ensure that the COTS display 10 is secured with the excess portion 14 of the COTS display 10 disposed above an upper edge 117 of the first pressure plate 116, preferably with the scribe line(s) aligned along the upper edge 117. Optionally, the alignment pins 138 may be movable between different pin holes in the inner surface 116*a*, e.g., that correspond to different predetermined sized displays. In addition or alternatively, one or more of the pins 138 may be received in corresponding pockets (not shown) in the second pressure plate 118, e.g., to facilitate aligning the first and second pressure plates 116, 118 when they are assembled together.

Once the COTS display 10 is placed against the inner surface 116*a*, the vacuum source may be activated to substantially secure the target portion 12 against the first pressure plate 116. With the first pressure plate 116 in its transverse orientation, the second pressure plate 118 may then be mounted to the first pressure plate 116, e.g., using one or more bolts or other fasteners 127. Thus, the COTS display 10 may be stabilized or otherwise maintained between the pressure plates 18. In one embodiment, the fasteners or alignment pins 138 may fix the second pressure plate 118 spaced apart from the first plate 116 by a predetermined distance, e.g., about five millimeters (0.200 inch).

The bladder 126 may then be inflated using the source of inflation media to a first predetermined pressure, between about one and three pounds per square inch (1-3 psi). The first predetermined pressure may be sufficient to maintain the plates 20 of the COTS display 10 at a predetermined spacing. For example, the first predetermined pressure may maintain the plates 20 of the COTS display 10 at the desired cell spacing for the COTS display 10 to operate normally, as described above. Stated differently, the first predetermined pressure may be sufficient to hold the plates 20 against the internal spacers (not shown) of the COTS display 10 without improperly compressing or otherwise damaging the spacers. Thus, the first predetermined pressure may prevent the plates 20 from moving away from one another, e.g., once the excess portion 14 is separated from the target portion 12, and the interior region of the target portion 12 is exposed to ambient pressure. If the plates have already been separated (as described below), the pressure from the bladder 126 may return the plates 20 to their original operational spacing. The bladder 126 may distribute the pressure substantially uniformly over the surface of the target portion 12 of the COTS display 10, e.g., to ensure that the spacing between the plates 20 remains substantially uniform over the area of the target portion 12.

The excess portion 14 of the COTS display 10 may protrude above the upper edges 117, 119 of the pressure plates 116, 118, e.g., to allow the excess portion 14 to be broken off from the target portion 12. The excess portion 14 may be bent to cause the plates 20 to break along the scribe lines created along the cut-line 2-2, as is known in the industry for breaking glass. For example, a torque or other substantially uniform force may be applied, e.g., manually, to the excess portion 14 substantially perpendicular to the plane of the plates 20 to break the plates 20.

Optionally, one or both of the upper edges 117, 119 of the pressure plates 166, 118 may include a breaker bar (not shown) to clamp the COTS display 10 immediately adjacent the scribe line(s). The breaker bar(s) may be used to clamp and hold the COTS display 10 below the scribe line(s), to provide a fulcrum for breaking off the excess portion 14 of the COTS display 10 and to maintain the cell spacing along the exposed edge of the target portion 12 after breaking the COTS display 10 into two portions. The breaker bars may be held in place with screws, bolts, and/or other fasteners (not shown), e.g., that may be adjustable in slots (also not shown) in the pressure plates 116, 118. Optionally, any alignment and assembly, e.g., of the pressure plates 116, 118 and/or breaker bars may be completed with the first pressure plate 116 in the horizontal orientation, shown in FIG. 4A. If the two portions 12, 14 have already been separated, the breaker bars may be unnecessary.

After assembly, pressurization, and/or and cleaning, the pressure plates 116, 118 may be moved to the vertical orientation, as shown in FIG. 5B, thereby orienting the excess portion 14 up, which may facilitate breaking and resealing, as described below. Thus, the excess portion 14 of the COTS display 10 may protrude from the pressure plates 116, 118, with the scribe line(s) precisely aligned with the upper edges 117, 119 and/or with the edge(s) of the breaker bar(s). For example, the scribe line(s) may be set about 0.50-1.25 millimeters (0.020 to 0.050 inch) above the upper edges 117, 119 of the pressure plates 116, 118 and/or the breaker bars. The excess portion 14 may be torqued a small angle, causing each of the plates 20 of the COTS display 10 to fracture along the scribe line(s), e.g., simultaneously or sequentially, thereby breaking and separating the excess portion 14 from the target portion 12 that remains between the pressure plates 116, 118.

With the excess portion 14 separated, the interior region of the target portion 12 is exposed to atmospheric pressure, which may be substantially higher than the original pressure within the interior region of the target portion 12. Because the target portion 12 is stabilized between the pressure plates 116, 118, e.g., using the bladder 126, the plates 20 remain substantially at the predetermined cell spacing. Without the pressure plates 116, 118, the tendency of the plates 20 would be to separate as air is drawn therebetween, which may impair or destroy the effectiveness of the target portion 12 to display images. Because of the pressure plates 116, 118, the plates 20 remain positioned against the spacers within the interior region to preserve the predetermined cell spacing.

With the excess portion 14 removed, the target portion 12 now has an exposed edge 16. As shown in FIGS. 4B and 4C, one or more seals may then be applied along the exposed edge 16 to substantially seal the interior region of the target portion 12 and/or ruggedize the target portion 12 to create the customized display 10'. For example, a first seal 26 may be applied along the exposed edge and preferably between the plates 20.

In one embodiment, to apply the first seal 26 between the plates 20, the bladder 126 may be expanded, e.g., by introducing additional inflation media therein, to squeeze the plates 20 towards one another. In an exemplary embodiment, the bladder 126 may be expanded to a second predetermined pressure greater than the first predetermined pressure, e.g., by increasing the pressure between about one and two pounds per square inch (1-2 psi). The second predetermined pressure may result in the spacers within the interior region being compressed slightly, but without causing any permanent deformation or damage.

In an alternative embodiment, it may be unnecessary to reduce the pressure to eject liquid crystal from between the plates 20. In this alternative, a low viscosity adhesive may sufficiently penetrate between the plates 20 given sufficient time, e.g., if the plates 20 are maintained in the vertical orientation shown in FIGS. 4B and 4C. Although this may increase the distance between the plates 20 (as the adhesive flows between the plates 20), the percentage of volume increase within the region between the plates 20 may be sufficiently low that the performance of the customized display may not be substantially affected. Alternatively, the adhesive may displace at least a portion of the LC material and/or may sufficiently mix with the LC material along the exposed edge to create a seal. In addition or alternatively, adhesive may be forced into the region between the plates 20, e.g., by manually or mechanically pressing against the exposed edge 16 after applying the adhesive, e.g., with a tool, dispenser, or even a finger or thumb, to press the adhesive in between the plates 20 (either with or without creating a space between the plates 20 to receive the adhesive).

As the plates 20 are squeezed, the volume of the interior region is reduced, thereby causing at least some of the liquid-crystal material therein to be ejected along the exposed edge 16 from between the plates 20 (since the liquid-crystal material is incompressible). The excess liquid-crystal material that has escaped along the exposed edge 16 may then be removed, e.g., by wiping, wicking, draining, and the like, e.g., with a cloth, paper, cotton swab, compressed air, and the like (not shown). If desired, the exposed edge 16 may also be cleaned or otherwise prepared in addition to removing the excess liquid-crystal material.

An adhesive, e.g., a bead of flowable adhesive, may then be applied along the exposed edge 16 to seal the target portion 12, e.g., while the target portion 12 is held in the vertical position. The adhesive may have an appropriate viscosity, e.g., to allow it to flow inwardly between the plates 20, and/or to fill any empty space in the target portion 12 between the plates 20 and the liquid crystal material remaining between the plates 20, as described further below. A wetting and/or thinning agent may be used, if it is desirable to reduce the viscosity of the adhesive. Commercially available UV curing acrylics with nominal viscosity have been found to be appropriate. Other adhesives, such as epoxies and urethanes, may also be suitable for use as the first seal.

The adhesive and/or target portion 12 may need to be outgassed, e.g., to remove any trapped gases and/or voids before the adhesive is cured. With reference to FIG. 4C, both the outgassing and the curing may be accomplished using the pressure plate tool 110 or other tool. As shown, the cover 132 may be placed over the base 120 to substantially isolate the pressure chamber 114, and consequently the target portion 12, from the surrounding environment. The second vacuum source may be reduced to a pressure sufficient to remove trapped gases from the adhesive and/or the interior region of the target portion 12, e.g., below about one pound per square inch (1 psi) absolute. The gases may be observed as bubbles at the top of the adhesive layer. When the bubbles stop accumulating on the surface of the adhesive, the degassing may be considered substantially completed.

Once sufficient degassing has been completed, the pressure chamber 114 may be brought back to atmospheric pressure, e.g., by deactivating the second vacuum source and/or opening a release valve to expose the pressure chamber 114 to ambient pressure. Optionally, the cover 132 may be removed or may remain over the base 120. Alternatively, the pressure chamber 114 may remain at the second predetermined pressure during the subsequent steps.

The pressure in the bladder 126 may then be reduced to a third predetermined pressure to draw the adhesive into the exposed edge 16 between the plates 20. As the pressure in the bladder 126 is reduced, the plates 20 may separate, thereby increasing the volume of the interior region, and drawing at least some of the adhesive between the plates 20 (to preserve the volume of material within the interior region). In an exemplary embodiment, the third predetermined pressure may be the same as the first predetermined pressure, such that the plates 20 are returned to the original predetermined cell spacing. Thus, the volume of adhesive drawn between the plates 20 may be substantially the same as the volume of liquid-crystal material that is ejected from between the plates 20. In addition or alternatively, the pressure within the chamber 114 may also be increased slightly, e.g., to force adhesive along the exposed edge 16 between the plates 20 or otherwise enhance penetration of the adhesive, if desired.

After the adhesive has penetrated between the plates 20, the adhesive may be cured by appropriate methods to complete resizing the customized display 10'. For example, for a UV-curable adhesive, the target portion 12 may be exposed to ultraviolet light for sufficient time to substantially cure the adhesive between the plates, e.g., for at least about thirty seconds to two minutes depending upon the intensity of the UV and the sensitivity of the adhesive. Optionally, a UV curing lamp(s) and/or heater(s) (not shown) may be mounted in the pressure chamber 114 of the pressure plate tool 110 to facilitate curing. Alternatively, other adhesives may be utilized that are cured using heat and/or pressure.

Optionally, any excess adhesive disposed along the exposed edge 16 may be removed, e.g., wiped away before the adhesive is cured, or cut, scraped away, or otherwise removed, e.g., using chemicals or mechanical devices, after the adhesive is cured. Alternatively, the excess adhesive may remain along the sealed exposed edge 16. For example, an excess amount of adhesive may be added to the display 10' to be used during subsequent assembly or other preparation of the final product. Such excess adhesive material may be contoured and shaped, e.g., by molding and the like, to facilitate interfacing with a bezel (not shown) and/or otherwise optimize the display design.

After curing, the customized display 10' is removed from the pressure plate tool 110, and cleaned as necessary and/or tested. Optionally, one or more additional seals may be added to the customized display 10', along the now-sealed exposed edge 16 and/or along one or more of the additional edges. For example, a second seal 27 may be added, as desired, and then outgassed and/or cured as necessary. The second seal 27 may be a silicone or other material, e.g., applied to minimize the penetration of humidity and/or other contaminants into the liquid crystal material inside the cell, e.g., when the display 10' subjected to its operating environment. Optionally, the second seal 27 may have black ink, dye, and/or other pigment added thereto to produce a substantially black or other opaque color, and may be applied up to the outer perimeter of the target display image area 40', to prevent back light from passing through the display 10' around the outer edges of the target display image area 40'.

In addition or alternatively, an optional mask or third seal 28 may be added to the newly-exposed plate edges, e.g., over the seal 27, and/or applied up to the outer perimeter of the target display image area 40'. The mask 28 is shown partially broken away in FIG. 2A. It should be dark, e.g., black, and may be tape, ink, sealant, adhesive, plastic, and/or any other suitable material. At least one of the second seal 27, or the optional mask 28 may be used to replace any of the original mask (not shown) removed during the customization process. Additionally, the mask 28 may be placed around the entire perimeter of the cell, e.g., substantially overlying the original perimeter seal 25 and original mask. The third seal or mask may cover part of the active area of the customized display 10' that is not used or desired to be seen be the user in the final implementation. Methods for applying such second and/or third seals 27, 28 are described in U.S. Pat. No. 6,204,906, the entire disclosure of which is expressly incorporated herein by reference.

Alternatively, the first seal 26 may serve the functions of the second and/or third seals just described. In addition or alternatively, one or more of the seals may be loaded with thermally conductive material, e.g., to aid in thermal conduction, and/or electrically conducting material, e.g., to aid in EMI shielding and/or grounding.

If any of the electronics, e.g., internal or external to the customized display 10', are cut, damaged, and/or removed, electrical continuity may need to be reestablished. Optionally, new circuits may be needed to replace those cut, damaged, and/or removed, or to enhance the functionality of the customized display 10'. Methods for repairing or replacing such circuits are described in U.S. Pat. No. 6,204,906, incorporated by reference above. Optionally, other cuts may be performed and/or sections of a COTS display may be removed, e.g., using the exemplary methods described in U.S. Pat. No. 6,204,906.

Figure 6:
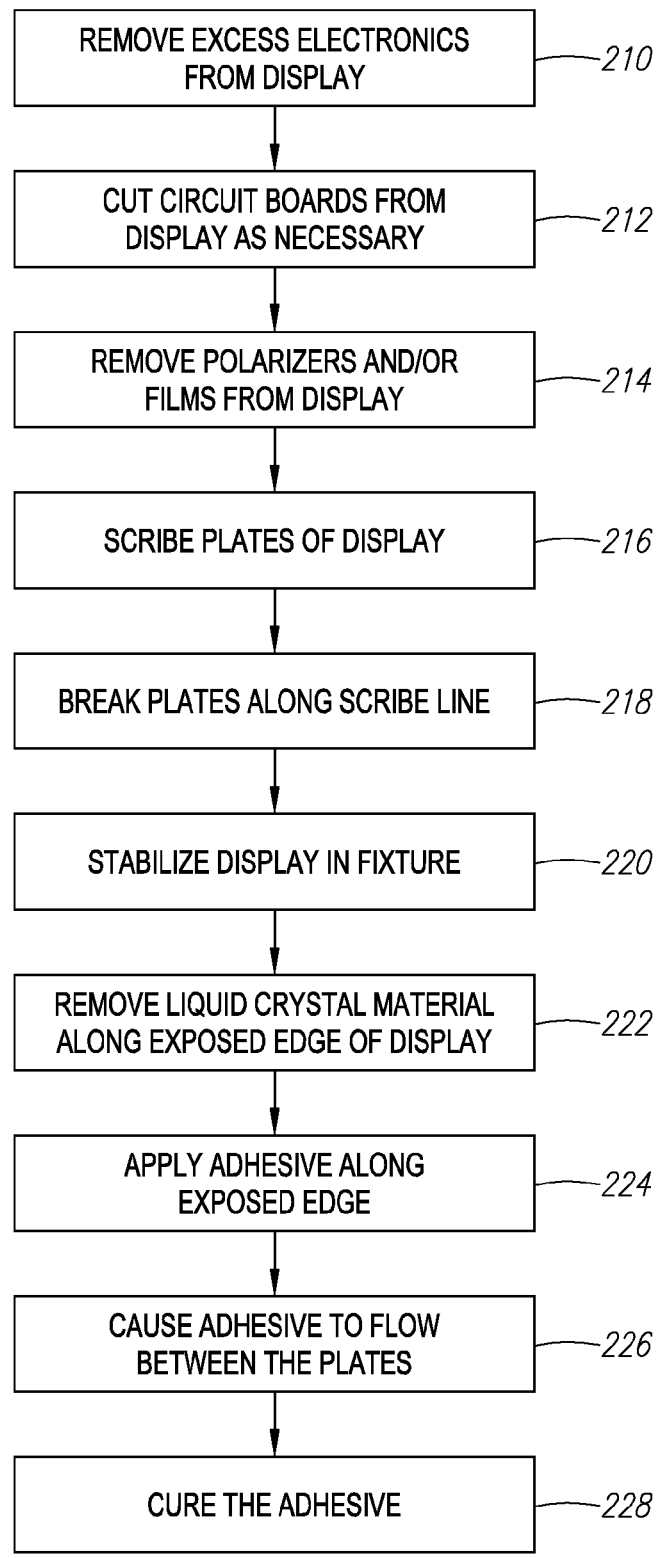
FIG. 6 is a flowchart showing an exemplary method for resizing or customizing an electronic display.

Turning to FIG. 6, an exemplary method is shown for resizing, customizing, or otherwise modifying an electronic display, such as a COTS AMLCD and the like. Although the steps are provided in a sequential order, it will be appreciated that the order in which the steps are performed may be varied. Further, one or more of the steps may be eliminated and/or may be substituted with one or more of the steps from other methods described herein.

First, at step 210, the display may be removed from its frame assembly, e.g., if a fully assembled display apparatus is being resized. This may include removing any excess electronics that may interfere with a portion of the resizing procedure, and/or that may be modified or replaced with other electronics.

At step 212, one or more circuit boards of the display may be cut, e.g., using hand or power tools, such as a hand shear. Optionally, any cut edges may trimmed or otherwise treated, e.g., using a mill, router, sandpaper, and the like.

At step 214, one or more polarizers and/or other films may be removed from at least a portion of the display, e.g., on the exposed surfaces of one or both plates of the display. For example, any films along the line to be scribed may be cut or otherwise removed, e.g., using a small electric circular saw. The saw may be mounted to a machine tool assembly, e.g., along with a milling machine, grinding machine, and/or other tools used during the resizing procedure.

Optionally, the display may be mounted on a vacuum chuck located at the machine tool assembly, and/or on a movable bed of the machine tool assembly. The machine tool assembly may be used to hold the display precisely and/or move it under the saw. Control of the machine tool, e.g., along X, Y and Z axes, may be used to control the motion of the vacuum chuck holding the display under the saw blade and/or other tools, similar to the previous embodiments.

This step may include removing a swath of the polarizer and/or other films to create a trench having a width, e.g., about 1.25 millimeters (0.050 inch) or less, centered over the intended cut line. Any sawdust or other residue from the films created from the sawing action may be removed using a vacuum cleaner, e.g., appropriately positioned on the saw and/or machine tool assembly. The film adhesive may be cleaned along the trench, e.g., using a cotton swab, fabric, sponge, and the like, alone or along with a solvent, such as 91% isopropyl alcohol solution. This procedure may be repeated on both sides of the display if polarizers or other films are provided on both sides. Alternatively, another procedure may be used for removing at least a portion (and optionally all) of the polarizer(s) on the plate(s) of the display. In yet another alternative, the display may not include any polarizers or films (e.g., as explained above), and this step may be omitted.

At step 216, one or both plates of the display may be scribed along the intended cut line(s). In one embodiment, the plates may be scribed with a glazer's scribe wheel along the intended cut line. The parameters for scribing using a scribe wheel, i.e., scribing speed and pressure, are similar to those used in the LCD industry for scribing glass plates of LCDs. The saw blade for cutting the polarizer(s) and the scribe wheel may be mounted on the same tool head, e.g., such that the cutting and scribing steps may be completed successively in one pass along each plate of the display. For example, the scribe wheel and/or saw may be lowered successively when used, e.g., using a pneumatic, hydraulic, mechanical, or other actuators that control the positions of the tools along the Z axis.

At step 218, the display may be broken along the scribe line(s). For example, the display may be removed from the vacuum chuck or other tool, and placed on a flat glass plate. A strip of material, e.g., a 0.008 inch thick silicone or rubber strip, may be placed on the flat plate before the display such that the rubber strip is substantially parallel to the scribe line offset to one side, e.g., about fifty (50) millimeters (two (2) inches) away from the scribe line. The scribe line of the upper plate may then be stroked with a cotton swab or other tool at moderate pressure, e.g., to cause the lower plate of the display to break along the scribe line. The display may be turned over, placed upon the flat plate over the rubber stripe and aligned in a similar manner, and the other plate (now exposed) may be stroked in a similar manner, to break the (now) lower plate along the scribe line. Thus, the display may be separated into multiple pieces, e.g., into a target portion and an excess portion.

If the plates are not broken after a single pass, these steps may be repeated, as necessary, on one or both sides of the display, until the display is separated. Generally, only one side of the display will break along the scribe line at a time (i.e., the lower plate opposite the upper plate being stroked). However, during some procedures, both sides may break simultaneously along the scribe lines. In addition, one or both plates may break spontaneously during the scribing operation, thereby omitted one or both of the stroking steps. Alternatively, the rubber strip may be replaced with a continuous sheet of flexible material under the display, and the display may be broken, e.g., using a tool that uniformly strikes the display along the scribe line, such as the tools used by Villa Precision for breaking glass done in the glass cutting industry. In a further alternative, the display may be broken and/or separated in the pressure plate tool, similar to the other embodiments described herein.

When the display breaks into the target and excess portions, the plates of the display may expand, e.g., along the exposed edges of the target and excess portions. As explained above, this may occur because the region between the plates of the display may be at a reduced pressure, e.g., substantially at a vacuum. When the display is broken or otherwise separated along the scribe line(s), atmospheric pressure may enter the region between the plates, thereby causing the plates to separate or otherwise expand away from one another a distance greater than the performance spacing. Alternatively, the scribed display may be broken along the scribe line(s) while maintaining the plates in their original performance spacing, e.g., by mounting the display in a fixture or using other procedures similar to those described elsewhere herein.

At step 220, the target portion of the display (the portion to be used for the resized display) may be placed in a pressure plate tool, e.g., similar to that described above. For example, the pressure plate tool may include two substantially rigid, parallel plates, at least one of which is covered with a bladder, such as a flexible silicone rubber and the like. The bladder may be held in place on one of the pressure plates, e.g., using bars on multiple (e.g., three) sides of the pressure plate. The pressure plates and/or bars may be formed from aluminum or other substantially rigid material capable of handling the pressures involved. In addition, the bladder may include one or more ports, e.g., on a top side of the bladder for delivering inflation media into the bladder, similar to the previous embodiments.

The display may be placed between the pressure plates with the exposed or cut edge of the target portion protruding slightly from one edge of the pressure plate tool, e.g., along top edges of the pressure plates. The pressure plates may be secured together, e.g., using one or more bolts, clips, or other fasteners. The pressure within the bladder may increased, e.g., adjusted to approximately two pounds per square inch (2 psi) gauge pressure, e.g., to return the distance between the plates substantially to their original gap distance. As explained above, this may be facilitated because the display includes internal spacers between the plates of the display, and the pressure may force the plates back against the spacers.

At step 222, a small amount of liquid crystal material may be ejected or otherwise removed from between the plates of the display along the exposed edge, e.g., to create a space between the plates for receiving an adhesive or other sealant. For example, the pressure in the bladder may be increased slightly, e.g., by about one to three psi, to compress the plates of the display slightly together from their intended performance spacing, thereby causing a small amount of LC material to be forced out along the exposed edge. The exposed LC material may be removed, e.g., using a cotton swab, fabric, or other absorbent or nonabsorbent material. In addition, the exposed edge may be cleaned and/or otherwise treated. Alternatively, the LC material may be removed from between the plates, e.g., by wicking, draining, and the like, similar to the embodiments described above.

At step 224, adhesive or other sealant material may be applied along the exposed edge. Optionally, the pressure plate tool (along with the target portion of the display) may be set in a vertical position to accept the adhesive, similar to the previous embodiments. For example, a UV curing acrylic adhesive may be applied from a dispenser substantially uniformly along the exposed edge. Any excess adhesive may be removed, e.g., using a cotton swab, fabric, and the like.

At step 226, the pressure in the bladder may be reduced, e.g., to about one pound per square inch gauge pressure, allowing the adhesive to penetrate and enter between the plates along the exposed edge. For an adhesive such as Loctite 349, it may require several minutes for the adhesive to penetrate sufficiently between the plates. For example, it may take about four (4) minutes for the adhesive to penetrate a distance of at least about 0.040 inch in between the plates. The penetration distance is generally proportional to the time allowed. The pressure may be reduced sufficiently to return the plates of the display to their original performance spacing, similar to the previous embodiments.

At step 228, the adhesive may then be cured. For example, one or more ultraviolet fluorescent lamps, e.g., rich in energy at about three hundred fifty nanometers (350 nm) wavelength, may be activated for at least about one minute. In an exemplary embodiment, a set of five lamps, such as Model F8T5BL lamps by Ushio may be sufficient. The adhesive may be only partially cured such that the display may be removed, and any excess adhesive may be cleaned or otherwise removed without permanent attachment to the pressure plate tool or display, e.g., in undesirable locations. The display and/or pressure plate tool may be cleaned, for example, with a solvent such as 91% isopropyl alcohol solution. Curing of the adhesive may then be completed by exposing the display to the UV lamps, e.g., for another ten (10) or more minutes.

Thereafter, the display may be cleaned as needed. Optionally, thereafter, additional electronics may be attached to the display and/or the display may be mounted within a bezel, box, or other assembly, similar to original displays.

While certain embodiments are illustrated in the drawings and are described herein, including preferred embodiments, it will be apparent to those skilled in the art that the specific embodiments described herein may be modified without departing from the inventive concepts described.

For example, depending upon the specific requirements for a particular application, various combinations of the customizing techniques described herein may be applied. The seals 26, 27, and 28, may be applied in different combinations, different amounts or ratios, and varying sequences, depending on the application. Some of the seals may be omitted or used redundantly as the application may require. In addition or alternatively, degassing may not be necessary in some applications.

Additionally, though the examples used herein generally referred to COTS AMLCDs as used in avionics where square displays are used, the concepts are equally applicable to other types of LCDs or other display technologies, and for other industrial applications including those requiring other customized shapes. Furthermore, though the examples used show only one set of row TABs and two sets of column TABS, in practice that may be switched, or there may be two sets of each, and the quantity of each may vary, all as is desired or needed for a specific application.

While the invention is susceptible to various modifications, and alternative forms, specific examples thereof have been shown in the drawings and are herein described in detail. It should be understood, however, that the invention is not to be limited to the particular embodiments or methods disclosed, but to the contrary, the invention is to cover all modifications, equivalents and alternatives falling within the scope of the appended claims.

I claim:

1. A method for resizing an electronic display, the display comprising a front plate, a back plate, a perimeter seal spacing the front and back plates apart, and image-generating medium contained in an area between the front and back plates and within the borders of the perimeter seal, the front and back plates being spaced apart by a predetermined cell gap, the method comprising:

creating a scribe line along each of the front and back plates to identify a target portion and an excess portion of the display;

breaking the display along the scribe lines to separate the target and excess portions of the display, thereby creating an exposed edge along the target portion communicating with the area between the plates of the target portion;

mounting the target portion between pressure plates of a fixture with the exposed edge protruding from an edge of the fixture, at least one of the pressure plates comprising a bladder;

increasing pressure within the bladder by about one to three psi to press the plates of the target portion towards one another, thereby causing image-generating material to be forced out along the exposed edge;

applying adhesive along the exposed edge; and decreasing the pressure within the bladder to return the plates of the target portion to the predetermined cell gap, thereby drawing the adhesive between the plates along the exposed edge.

2. The method of claim 1, further comprising curing the adhesive after the plates of the target portion are returned to the predetermined cell gap, thereby creating a first seal between the plates along the exposed edge, the first seal creating a barrier to prevent the image-generating medium from escaping out of the area between the plates of the target portion.

3. The method of claim 2, wherein the adhesive is cured by exposing the adhesive to ultraviolet light.

4. The method of claim 1, further comprising removing image-generating material that is forced out along the exposed edge when the plates of the target portion are pressed towards one another.

5. The method of claim 4, wherein the image-generating medium is removed before the adhesive is applied along the exposed edge.

6. The method of claim 1, wherein the target portion of the display is mounted within the fixture before the display is broken.

7. The method of claim 1, wherein the target portion of the display is mounted to a first of the pressure plates, and wherein a second of the pressure plates is mounted to the first of the pressure plates at a predetermined spacing.

8. The method of claim 1, wherein the target portion of the display is mounted between the pair of pressure plates by inflating the bladder to a first pressure for maintaining the plates of the target portion at the predetermined cell gap, wherein the plates of the target portion are pressed towards one another by inflating the bladder to a second pressure greater than the first pressure, and wherein the plates of the target portion are returned to the predetermined cell gap by deflating the bladder to a third pressure less than the second pressure.

9. The method of claim 1, wherein the adhesive is applied along the exposed edge without removing image-generating material forced out along the exposed edge.

10. The method of claim 1, further comprising removing image-generating material that is forced out along the exposed edge.

11. The method of claim 10, wherein the image-generating medium is removed before the adhesive is applied along the exposed edge.

12. The method of claim 1, wherein the display is broken by placing a strip along the at least one scribe line, and directing material along the at least one scribe line to cause the front and back plates to break along the at least one scribe line.

13. The method of claim 1, wherein breaking the display comprises:

placing the display on a flat plate with the back plate adjacent the flat plate;

applying pressure to the display to cause the back plate to break along the scribe line;

turning the display over so that the front plate is adjacent the flat plate; and applying pressure to the display to cause the front plate to break along the scribe line, thereby separating the target and excess portions and creating the exposed edge.

14. A method for resizing an electronic display, the display comprising a front plate, a back plate, a perimeter seal spacing the front and back plates apart, and image-generating medium contained in an area between the front and back plates and within the borders of the perimeter seal, the front and back plates being spaced apart by a predetermined cell gap, the method comprising:

creating a scribe line along each of the front and back plates to identify a target portion and an excess portion of the display;

placing the display on a flat plate with the back plate adjacent the flat plate;

applying pressure to the display to cause the back plate to break along the scribe line;

turning the display over so that the front plate is adjacent the flat plate;

applying pressure to the display to cause the front plate to break along the scribe line, thereby separating the target and excess portions and creating an exposed edge along the target portion communicating with the area between the plates of the target portion;

placing the target portion between pressure plates of a fixture with the exposed edge protruding from one edge of the fixture, at least one of the pressure plates comprising a bladder;

inflating the bladder to press the front and back plates of the target portion towards one another, thereby causing image-generating material to be forced out along the exposed edge;

applying adhesive along the exposed edge;

at least partially deflating the bladder, thereby drawing the adhesive between the plates along the exposed edge and returning the plates of the target portion to the predetermined cell gap; and curing the adhesive after the plates of the target portion are returned to the predetermined cell gap, thereby creating a first seal between the plates along the exposed edge, the first seal creating a barrier to prevent the image-generating medium from escaping out of the area between the plates of the target portion.

15. The method of claim 14, wherein the adhesive is cured by exposing the adhesive to ultraviolet light.

16. The method of claim 14, further comprising:
inflating the bladder to a first predetermined pressure after the target portion is placed between the pressure plates to return the plates of the target portion to the predetermined cell gap, and
wherein the bladder is inflated to a second predetermined pressure greater than the first predetermined pressure to press the front and back plates of the target portion towards one another.

17. The method of claim 16, wherein the first predetermined pressure is approximately two pounds per square inch (2 psi).

18. The method of claim 16, wherein the second predetermined pressure is about one to three psi greater than the first predetermined pressure.

19. The method of claim 16, wherein the bladder is deflated to a third predetermined pressure less than the second predetermined pressure.

20. The method of claim 14, wherein the adhesive is applied along the exposed edge without removing image-generating material forced out along the exposed edge.

21. The method of claim 14, further comprising removing image-generating material that is forced out along the exposed edge.

22. The method of claim 21, wherein the image-generating medium is removed before the adhesive is applied along the exposed edge.

\* \* \* \* \*